(12) United States Patent
Liu et al.

(10) Patent No.: US 11,159,190 B2
(45) Date of Patent: Oct. 26, 2021

(54) ANTENNA, TERMINAL, METHOD FOR REALIZING ADJUSTMENT AND CONTROL OF ANTENNA AND DEVICE FOR ADJUSTMENT AND CONTROL OF ANTENNA

(71) Applicant: ZTE Corporation, Shenzhen (CN)

(72) Inventors: Fengpeng Liu, Shenzhen (CN); Dongmei Liu, Shenzhen (CN)

(73) Assignee: ZTE Corporation, Shenzhen (CN)

(*) Notice: Subject to any disclaimer, the term of this patent is extended or adjusted under 35 U.S.C. 154(b) by 0 days.

(21) Appl. No.: 16/770,564

(22) PCT Filed: Sep. 25, 2018

(86) PCT No.: PCT/CN2018/107326
§ 371 (c)(1),
(2) Date: Jun. 5, 2020

(87) PCT Pub. No.: WO2019/109713
PCT Pub. Date: Jun. 13, 2019

(65) Prior Publication Data
US 2021/0091814 A1 Mar. 25, 2021

(30) Foreign Application Priority Data
Dec. 7, 2017 (CN) .......................... 201711287943.7

(51) Int. Cl.
*H04B 1/10* (2006.01)
*H04B 1/12* (2006.01)

(52) U.S. Cl.
CPC .................................. *H04B 1/126* (2013.01)

(58) Field of Classification Search
CPC ........ H04B 1/1027; H04B 1/126; H04B 1/18; H04B 1/44; H04B 7/0086; H04B 7/0814
See application file for complete search history.

(56) References Cited

U.S. PATENT DOCUMENTS

| 2007/0191068 A1* | 8/2007 | Ochi | ....................... H01Q 3/04 455/562.1 |
| 2011/0169712 A1 | 7/2011 | Sumi et al. | |

(Continued)

FOREIGN PATENT DOCUMENTS

| CN | 104300234 A | 1/2015 |
| CN | 105428785 A | 3/2016 |

(Continued)

OTHER PUBLICATIONS

International Search Report and Written Opinion for International Application No. PCT/CN2018/107326, dated Jan. 4, 2019.

(Continued)

*Primary Examiner* — Tuan Pham
(74) *Attorney, Agent, or Firm* — Vivacqua Crane (57) ABSTRACT

An antenna, a terminal, a method and device for implementing control of an antenna, the method including: detecting whether at least two sub-radiation areas are interfered, the at least two sub-radiation areas each corresponding to a respective one of feed points and forming a radiation area of an antenna radiator; controlling the feed points based on detection on the at least two sub-radiation areas, so as to use an un-interfered sub-radiation area of the at least two sub-radiation areas of the antenna radiator as a current antenna radiator.

20 Claims, 7 Drawing Sheets

(56) References Cited

U.S. PATENT DOCUMENTS

| | | | |
|---|---|---|---|
| 2013/0324056 A1 | 5/2013 | Maguire | |
| 2013/0234903 A1 | 9/2013 | Kwak et al. | |
| 2013/0287133 A1* | 10/2013 | Coon | H04B 7/0608 375/267 |
| 2014/0266937 A1* | 9/2014 | Mahanfar | H01Q 9/00 343/726 |
| 2016/0172753 A1 | 6/2016 | Tai | |

FOREIGN PATENT DOCUMENTS

| | | |
|---|---|---|
| CN | 106790795 A | 5/2017 |
| CN | 106972255 A | 7/2017 |
| EP | 2704254 A1 | 5/2014 |

OTHER PUBLICATIONS

European Patent Office, Supplementary European Search Report for EP Application No. 18886877.2, dated Jul. 19, 2021, pp. 1-4.
European Patent Office, European Search Opinion for EP Application No. 18886877.2, dated Jul. 19, 2021, pp. 1-3.

* cited by examiner

AA:
detecting whether at least two sub-radiation areas are interfered, the at least two sub-radiation areas each corresponding to a respective one of feed points and forming a radiation area of an antenna radiator BB:
controlling the feed points according to detection on the at least two sub-radiation areas, so as to use an un-interfered sub-radiation area of the at least two sub-radiation areas of the antenna radiator as a current antenna radiator

FIG. 10

ANTENNA, TERMINAL, METHOD FOR REALIZING ADJUSTMENT AND CONTROL OF ANTENNA AND DEVICE FOR ADJUSTMENT AND CONTROL OF ANTENNA

CROSS-REFERENCE TO RELATED APPLICATION

This application is a national stage filing under 35 U.S.C. § 371 of international application number PCT/CN2018/107326, filed Sep. 25, 2018, which claims priority to Chinese patent application No. 201711287943.7 filed Dec. 7, 2017. The contents of these applications are incorporated herein by reference in their entirety.

TECHNICAL FIELD

This application relates to, but not limited to, mobile communication technology, and in particular, to an antenna, a terminal, a method for realizing adjustment and control of an antenna, and a device for adjustment and control of an antenna.

BACKGROUND

Generally, there are substantially three types of antenna for a terminal: planar inverted-F antenna (PIFA), loop antenna, and monopole antenna. An antenna may include three parts: an antenna radiator, i.e., an antenna trace, a feed point, and a regulatory circuit.

Antennas of any type will be affected by the surrounding environment, such as: usage scenarios for a mobile terminal (in which, for example, the antenna will be touched when holding the mobile terminal), position of a user relative to a base station, frequency band, network standard and other factors. In the current mobile terminal, a variety of sensors are configured for detecting the information affecting operation of the antenna. In addition, through the global positioning system (GPS) and an underlying software, it is possible to record information such as resident base station identity (ID), network, and signal strength.

In the existing art, for issues that the performance of an antenna is reduced and the communication quality is affected due to a random medium close to or in contact with the antenna, it mainly relies on a circumvention scheme in which the antenna is designed to be away from an appearance surface to minimize occurrence of the random medium being close to or in contact with the antenna. The scheme is however disadvantageous in that the antenna is thick and heavy in form, and can only use traditional materials such as plastic, instead of popular materials such as ceramic metal. In other words, either adequate form which may compromise the antenna performance, or the antenna performance which may compromise the antenna form can be ensured.

Additionally, in the existing art, in case that the signal quality deteriorates drastically, it typically switches to another antenna radiator instead of using the current antenna radiator to solve the problem. However, the affected antenna body is completely discarded in this way, i.e., it can only be applied to scenarios with at least two antennas, the application scenario is so limited that there is almost no possibility of application.

SUMMARY

In order to solve the above technical problems, according to some embodiments of the present disclosure, an antenna, a terminal, a method for implementing control of an antenna, and a device for controlling an antenna are provided.

According to some embodiments of the present disclosure, an antenna is provided, including:

an antenna radiator, which has a radiation area including at least two sub-radiation areas each corresponding to a respective one of feed points;

detection devices, each corresponding to a respective sub-radiation area of the at least two sub-radiation areas and configured for detecting whether the respective sub-radiation area is interfered;

an antenna controller, which is configured for controlling the feed points based on detection on the at least two sub-radiation areas, so as to use an un-interfered sub-radiation area of the at least two sub-radiation areas of the antenna radiator as a current antenna radiator.

According to some embodiments of the present disclosure, a terminal is provided, including the antenna described above.

According to some embodiments of the present disclosure, a device for controlling an antenna is provided, including:

at least two pairs of feed points, each pair including a signal feed point and a ground feed point and corresponding to at least one detection device configured for detecting whether a respective one of sub-radiation areas is interfered;

a switch group; and an antenna, which is controller configured for controlling, based on detection by the at least one detection device, each of the at least two pairs of feed points by controlling the switch group to be turned off.

According to some embodiments of the present disclosure, a method for implementing control of an antenna is provided, including:

detecting whether at least two sub-radiation areas are interfered, the at least two sub-radiation areas each corresponding to a respective one of feed points and forming a radiation area of an antenna radiator; and controlling the feed points based on detection on the at least two sub-radiation areas, so as to use an un-interfered sub-radiation area of the at least two sub-radiation areas of the antenna radiator as a current antenna radiator.

According to some embodiments of the present application, a computer-readable storage medium storing computer-executable instructions which are configured for performing the method for implementing control of an antenna described above, is further provided.

According to some embodiments of the present application, a device for implementing control of an antenna is further provided, including:

a processor, and a memory storing computer programs executable by the processor for:

detecting whether at least two sub-radiation areas are interfered, the at least two sub-radiation areas each corresponding to a respective one of feed points and forming a radiation area of an antenna radiator; and     controlling the feed points based on detection on the at least two sub-radiation areas, so as to use an un-interfered sub-radiation area of the at least two sub-radiation areas of the antenna radiator as a current antenna radiator.

The technical solution of the embodiments of the present application at least includes:

detecting whether at least two sub-radiation areas are interfered, the at least two sub-radiation areas each corresponding to a respective one of feed points and forming a radiation area of an antenna radiator; and controlling the feed points based on detection on the at least two sub-radiation areas, so as to use an un-interfered sub-radiation area of the at least two sub-radiation areas of the antenna radiator as a current antenna radiator.

Through the embodiments of the present application, in which the same antenna is divided equivalently so as to control feed points of a sub-radiation area for using or abandoning thereof, in order to abandon an interfered sub-radiation area of the antenna radiator instead of directly abandoning the interfered antenna, it is possible to achieve control on whether to use an area divided from the antenna or not, which ensures the antenna performance and the communication quality, and the embodiments of the present application are not limited to scenarios with at least two antennas.

Additional features and advantages of the disclosure will be set forth in the description which follows, and in part will be obvious from the description, or may be learned by the practice of the disclosure. The objects and other advantages of the present disclosure can be realized and obtained by the structures particularly pointed out in the description, claims and drawings.

BRIEF DESCRIPTION OF DRAWINGS

The drawings are provided for a further understanding of the technical solutions of the present application, and constitute a part of the description. The drawings and the embodiments of the present application are used to explain the technical solutions of the present application.

DETAILED DESCRIPTION

Objects, technical solutions and advantages of the present disclosure will be clearer from a detailed description of embodiments of the present application in conjunction with the drawings. It is to be noted that if not in collision, the embodiments and features therein in the present application may be combined with each other.

Figure 1:
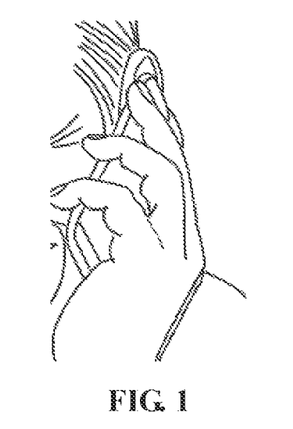
FIG. 1 is a schematic diagram of a first scenario in which communication is affected by areas close to an antenna and areas in contact with the antenna.
Figure 2:
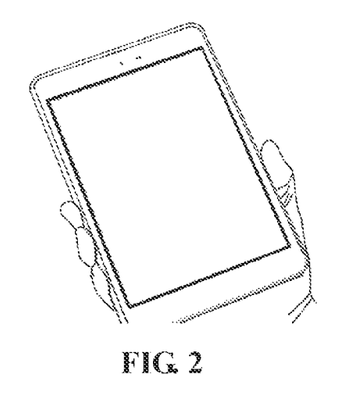
FIG. 2 is a schematic diagram of a second scenario in which communication is affected by areas close to an antenna and areas in contact with the antenna.
Figure 3:
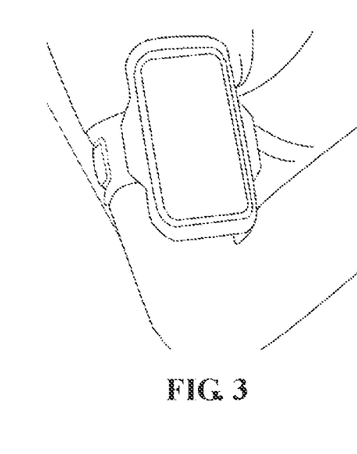
FIG. 3 is a schematic diagram of a third scenario in which communication is affected by areas close to an antenna and areas in contact with the antenna.
Figure 4:
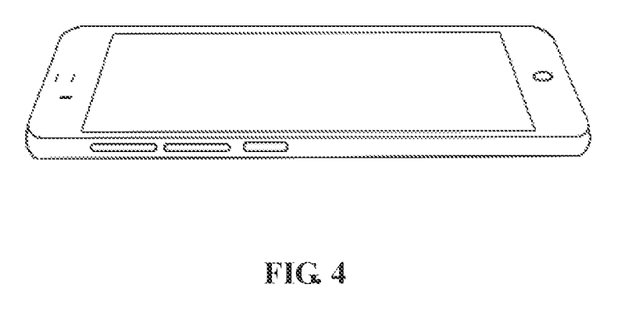
FIG. 4 is a schematic diagram of a fourth scenario in which communication is affected by areas close to an antenna and areas in contact with the antenna.

In a complex application environment, a terminal may be close to or in contact with a medium that will affect performance of an antenna. As an example shown in FIG. 1, when a user holds a mobile terminal close to an ear to make a call, areas of the user's head and hand contacting the mobile terminal and areas of the user's head and hand close to the mobile terminal have great influence on communication. As another example shown in FIG. 2, when a user holds a data service, areas of the user's hand contacting the mobile terminal and areas of the user's hand close to the mobile terminal have great influence on communication. As yet another example shown in FIG. 3, when a user carries a mobile terminal, the human body is close to the entire antenna, which has great influence on communication. As still another example shown in FIG. 4, when a user places a mobile terminal on a panel of certain material, the material is in contact with the antenna, which has great influence on communication, and different materials, which are different in dielectric constant, present different influences on communication.

Figure 5:
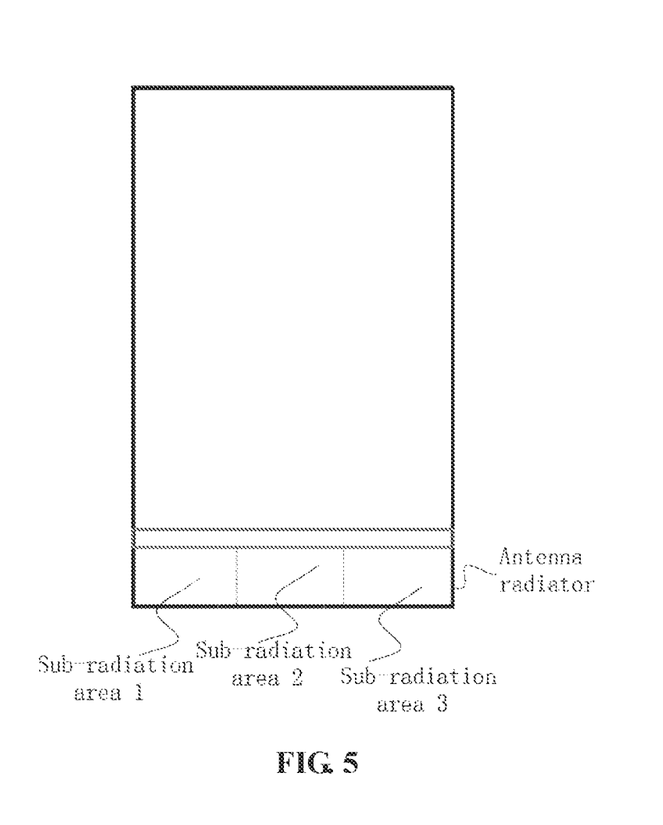
FIG. 5 is a schematic structural diagram of an antenna according to some embodiments of the present application.

In order to solve the problem that a terminal is interfered by being close to or in contact with a medium in a complex application environment which influences the performance of the antenna, as shown in FIG. 5, an antenna is provided according to some embodiments of the application, at least including:

an antenna radiator, which has a radiation area divided into at least two sub-radiation areas, each sub-radiation area corresponding to a respective one of feed points; for convenience of drawing, only three sub-radiation regions such as Sub-radiation region 1, Sub-radiation region 2, and Sub-radiation region 3 are exemplified in FIG. 5;

detection devices, each of which corresponds to a respective sub-radiation area of the at least two sub-radiation areas and is configured for detecting whether the respective sub-radiation area is interfered, such as being close to or in contact with a medium; optionally, a detection device such as a sensor may be provided in the antenna radiator corresponding to each sub-radiation area; and an antenna controller (not shown in FIG. 5) configured for controlling the feed points based on detection on the at least two sub-radiation areas, so as to use an un-interfered sub-radiation area of the at least two sub-radiation areas of the antenna radiator as a current antenna radiator.

It should be noted that FIG. 5 shows an example of dividing the radiation area of a complete antenna radiator. Though in FIG. 5 the antenna radiator is exemplarily shown to be located at the bottom of the mobile terminal, it is not limited to a certain end surface, nor is it limited to the shape and material of the antenna. Of course, the form and shape of the terminal are not limited.

As shown in FIG. 5, the sub-radiation areas divided from the antenna radiation area according to some embodiments of the present application distinguish the possible touching situations when an end user uses the terminal. As an example, for the usage scenarios shown in FIGS. 1 and 2, positions corresponding to the Sub-radiation area 1 and Sub-radiation area 3 are easily touched, thereby affecting the performance of the whole antenna. As another example, for the usage scenario shown in FIG. 3, position corresponding to the Sub-radiation area 2 is easily touched, thereby affecting the performance of the whole antenna. As yet another example, for the usage scenario shown in FIG. 4, positions corresponding to the Sub-radiation area 1, Sub-radiation area 2 and Sub-radiation area 3 are easily touched, thereby affecting the performance of the whole antenna.

Figure 6A:
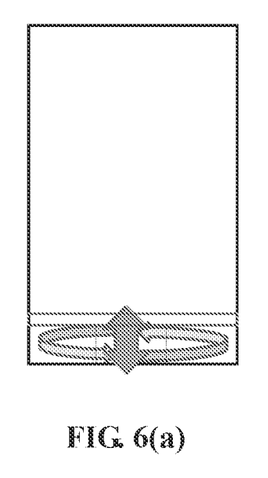
FIG. 6(a) is a schematic diagram showing operation of the antenna according to some embodiments of the present application, when an antenna radiation area is not interfered.
Figure 6B:
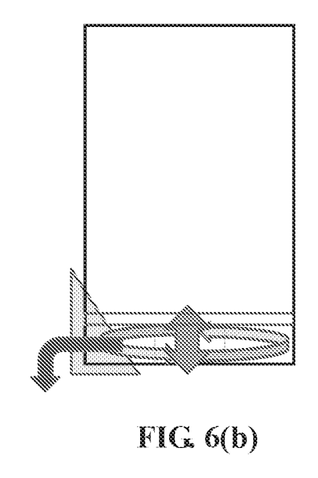
FIG. 6(b) is a schematic diagram showing operation of the antenna according to some embodiments of the present application, when the antenna radiation area is interfered.

FIG. 6(a) is a schematic diagram showing operation of the antenna according to some embodiments of the present application, when the antenna radiation area is not interfered. FIG. 6(a) shows that when the antenna radiator is not interfered, e.g. not approached or contacted, a complete current loop is formed over the entire antenna radiator, resulting in robust electromagnetic field radiation. Assuming that the antenna radiator is interfered, e.g. close to or in contact with a medium, as shown in FIG. 6(b) which is a schematic diagram showing operation of the antenna according to some embodiments of the present application when the antenna radiation area is interfered (the triangle area in FIG. 6(b) shows interference), then the originally complete current path over the entire antenna radiator branches a shunt path through the medium that is close to or in contact with the antenna radiator, so that the electromagnetic field radiation is weakened, thereby reducing the antenna performance and affecting communication quality.

Optionally, the detection devices according to some embodiments of the present application may be any device that can detect whether the antenna radiator is interfered, such as a sensor which may include, but is not limited to, an inductive sensor, a capacitive sensor, and the like.

The sensor detects a dielectric state of the sub-radiation area of the antenna to which it corresponds in real time. If the antenna is interfered, for example, there is a medium close to or in contact with the sub-radiation area of the antenna, then the dielectric state of the sub-radiation area of the antenna will change, thereby it may be determined that the sub-radiation area of the antenna radiator is interfered, i.e., close to or in contact with the medium.

Figure 7:
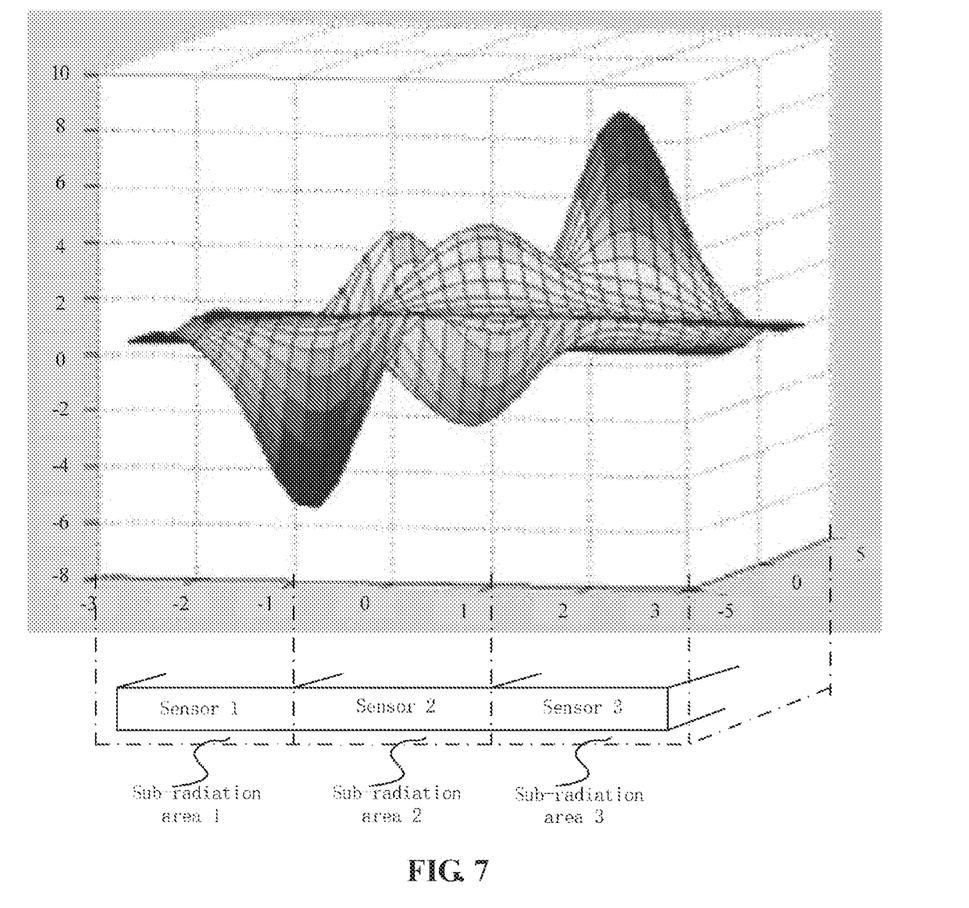
FIG. 7 is a schematic diagram showing capacitance distribution across the antenna radiation area according to some embodiments of the present application.

Optionally, a detection threshold may be preset. When a dielectric state value detected by the sensor is higher than the preset detection threshold, it is considered that the sub-radiation area of the antenna radiator is interfered, i.e., close to or in contact with a medium, and an interference state value may be represented by a number "1". When the dielectric state value detected by the sensor is not higher than the preset detection threshold, it is considered that the sub-radiation area of the antenna radiator is not interfered, i.e., not close to or in contact with a medium, and the interference state value may be represented by a number "0". In addition, when the detected dielectric state value is higher than the preset detection threshold, the greater the difference between the detected dielectric state value and the preset detection threshold, the more serious the interference is. Referring to FIG. 5, three sensors are provided on the antenna radiator respectively corresponding to three sub-radiation areas, each sensor is configured for detecting a dielectric state of a respective one of the sub-radiation areas of the antenna radiator. If there is a medium in contact with a sub-radiation area, then the sub-radiation area will change in dielectric state value, i.e., dielectric constant, in real time. As shown in FIG. 7, taking a dielectric capacitive sensor as an example, three sensors can provide a profile of capacitance distribution over the antenna radiation area of a terminal in real time. If the detection threshold is set to 6, then a sub-radiation area with a capacitance absolute value exceeding 6 is determined to be in severe contact with a medium. As shown in FIG. 7, the Sub-radiation area 3 to which Sensor 3 corresponds is in severe contact with a medium.

Optionally, the antenna controller is specifically configured for: obtaining a combination of interference state values for each of the at least two sub-radiation areas based on detection on each of the at least two sub-radiation areas, and controlling the feed points in an antenna feed point control manner corresponding to the combination of interference state values for each of the at least two sub-radiation areas, so as to use an un-interfered sub-radiation area of the at least two sub-radiation areas of the antenna radiator as a current antenna radiator.

Taking division into three sub-radiation regions as shown in FIG. 5 as an example, a correspondence between the combination of interference state values for each sub-radiation area and the antenna feed point control manner is shown in Table 1.

TABLE 1

| Sub-radiation area 1 | Sub-radiation area 2 | Sub-radiation area 3 | State | Antenna feed point control manner |
|---|---|---|---|---|
| 0 | 0 | 0 | I | Using feed points corresponding to Sub-radiation area 1 to Sub-radiation area 3 |
| 0 | 0 | 1 | II | Using feed points corresponding to Sub-radiation area 1 and Sub-radiation area 2 instead of the feed points corresponding to Sub-radiation area 3 |
| 0 | 1 | 0 | III | Using feed points corresponding to Sub-radiation area 1 and Sub-radiation area 3 instead of the feed points corresponding to Sub-radiation area 2 |
| 0 | 1 | 1 | IV | Using feed points corresponding to Sub-radiation area 1 instead of the feed points corresponding to Sub-radiation area 2 and Sub-radiation area 3 |
| 1 | 0 | 0 | V | Using feed points corresponding to Sub-radiation area 2 and Sub-radiation area 3 instead of the feed points corresponding to Sub-radiation area 1 |
| 1 | 0 | 1 | VI | Using feed points corresponding to Sub-radiation area 2 instead of the feed points corresponding to Sub-radiation area 1 and Sub-radiation area 3 |
| 1 | 1 | 0 | VII | Using feed points corresponding to Sub-radiation area 3 instead of the feed points corresponding to Sub-radiation area 1 and Sub-radiation area 2 |
| 1 | 1 | 1 | VIII | Using feed points corresponding to at least one of Sub-radiation area 1 to Sub-radiation area 3 |

In Table 1, 0 represents that the sub-radiation area is not interfered, while 1 represents that the sub-radiation area is interfered. In this way, for an antenna radiator including three sub-radiation areas, it can present eight states respectively corresponding to eight antenna feed point control manners.

In particular, in Table 1, if all detection devices on the antenna radiator respectively corresponding to each of the sub-radiation areas detect that all corresponding sub-radiation areas are interfered, then according to some embodiments of the present application, the interfered antenna radiator is not directly abandoned, instead, the antenna will be continuously used by controlling the feed points of all sub-radiation areas in any combination.

Figure 8:
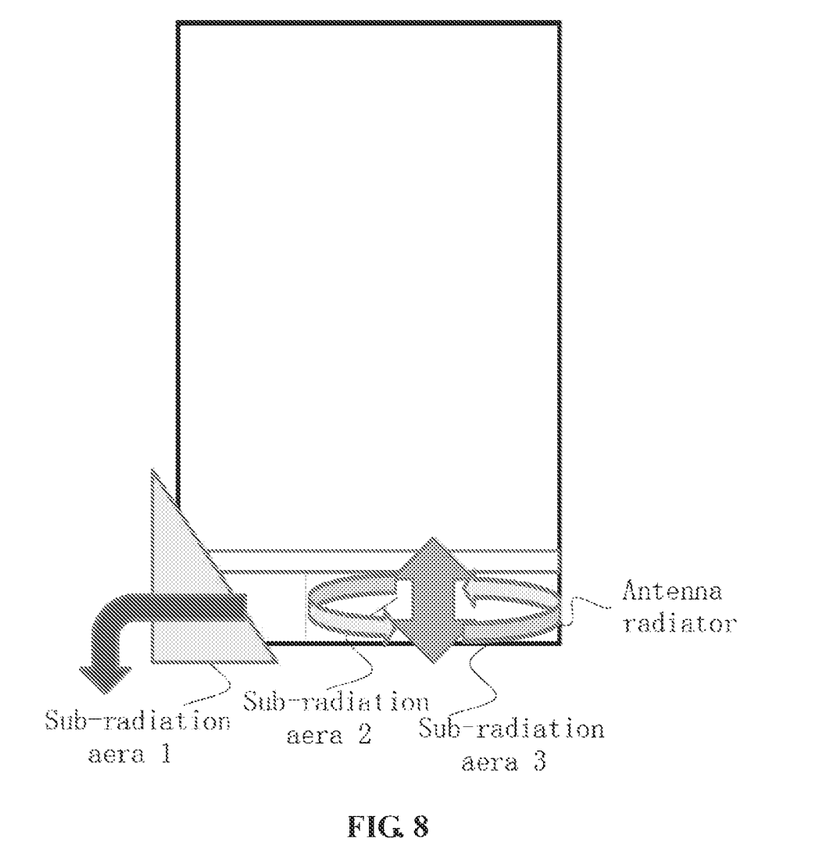
FIG. 8 is a schematic diagram of an antenna feed point control manner according to some embodiments of the present application.

Taking Sub-radiation area 1 close to or in contact with a medium as an example, as shown in FIG. 8, by using the antenna feed point control manner according to some embodiments of the present application in which the feed points of Sub-radiation area 1 close to or in contact with a medium are controlled to be disconnected, the shunt through the medium becomes small. The current path close to or in contact with the medium is a long path, while the circulating current path passing through Sub-radiation area 2 and Sub-radiation area 3 is the shortest path. Because current always flows through the shortest path, less loss in radiated electromagnetic field can be realized, thereby ensuring the antenna performance as much as possible, and also ensuring the communication quality for a user.

Figure 9:
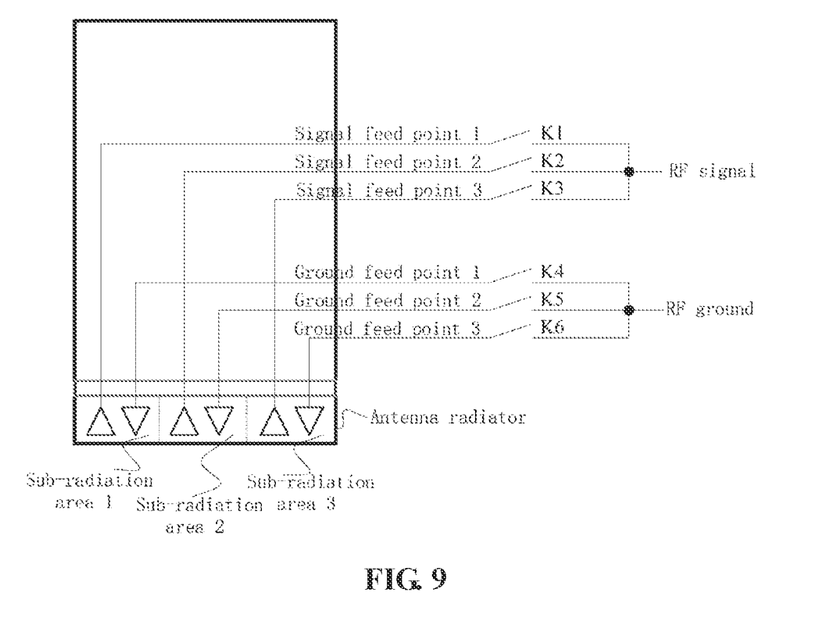
FIG. 9 is a schematic diagram of connection between feed points via switches according to some embodiments of the present application.

Optionally, the feed points include a signal feed point and a ground feed point. A switch group is configured for connection between the signal feed point and an RF signal, and between the ground feed point and an RF ground. The connection may be in various forms such as daisy chain, loop, serial-parallel hybrid, etc. FIG. 9 is a schematic diagram of connection between feed points via switches according to some embodiments of the present application. Taking the antenna radiator divided into three sub-radiation regions shown in FIG. 5 as an example, FIG. 9 shows a schematic diagram of a typical daisy chain switch connection.

In a specific implementation, different sub-radiation areas of the antenna radiator may be pre-marked, and each sub-radiation area is provided with an independent signal feed point and ground feed point. When it is detected that there is a medium close to or in contact with a sub-radiation area, the sub-radiation area is abandoned. Here, "abandoned" means the signal feed point and the ground feed point corresponding to the sub-radiation area will not be used, so that antenna radiation from the sub-radiation area will reduce significantly, thereby the sub-radiation area has little contribution to and influence on the whole antenna. Alternatively, different sub-radiation areas of the antenna radiator may be pre-marked, and for the signal feed point and the ground feed point of each sub-radiation area, a respective switch is provided, as shown in FIG. 9. When it is detected that there is a medium close to or in contact with a sub-radiation area, the switch for the ground feed point of the sub-radiation area is turned on, while the switch for the signal feed point of the sub-radiation area is turned off, to isolate the influence of the medium on the antenna.

Optionally, in order to achieve the corresponding antenna feed point control manner, the controlling the feed points based on detection on the at least two sub-radiation areas, so as to use an un-interfered sub-radiation area of the at least two sub-radiation areas of the antenna radiator as a current antenna radiator includes:

turning off a switch for the ground feed point and a switch for the signal feed point corresponding to an interfered sub-radiation area of the at least two sub-radiations; or turning on the switch for the ground feed point corresponding to the interfered sub-radiation area of the at least two sub-radiations, and turning off the switch for the signal feed point corresponding to the interfered sub-radiation area of the at least two sub-radiations;

for the ground feed point and signal feed point corresponding to the un-interfered sub-radiation area of the at least two sub-radiations, traversing pre-obtained correspondences between each of feed point control state combinations respectively corresponding to each of antenna feed point control manners and a signal strength, and selecting one of the feed point control state combinations with optimal communication quality for on or off control on the feed points corresponding to the un-interfered sub-radiation area of the at least two sub-radiations.

The antenna radiator is constant and is already connected. By using the method for controlling an antenna according to some embodiments of the present application, in which the same antenna is divided equivalently so as to control feed points of a sub-radiation area for using or abandoning thereof, in order to abandon an interfered sub-radiation area of the antenna radiator instead of directly abandoning the interfered antenna, it is possible to achieve control on whether to use an area divided from the antenna or not, which ensures the antenna performance and the communication quality, and the embodiments of the present application are not limited to scenarios with at least two antennas.

Optionally, if the detection devices on the antenna radiator respectively corresponding to each of the sub-radiation areas detect that all corresponding sub-radiation areas are interfered, then the antenna controller is further configured for:

performing, by using a preset combination control manner, on or off control on the feed points respectively corresponding to each of the at least two sub-radiation areas that is interfered, for the feed points of all of the at least two sub-radiation areas; or controlling the feed points based on a degree of interference, so as to use a less interfered sub-radiation area of the at least two sub-radiation areas of the antenna radiator as a current antenna radiator. For example, a switch for the feed point corresponding to the most seriously interfered sub-radiation area may be turned off.

When the detected dielectric state value is higher than the preset detection threshold, the greater the difference between the detected dielectric state value and the preset detection threshold, the more serious the interference is.

Optionally, the antenna controller is further configured for storing current control information on the feed points respectively corresponding to each of the at least two sub-radiation areas, and sharing the current control information to a cloud through a network for multi-user terminal analysis. Analysis on an antenna state for a mobile terminal based on data from multiple user terminals further realizes sharing of the optimal antenna state in an unfamiliar area where the current user is located, so that other subsequent user terminals can preset the antenna state.

Optionally, a specific implementation for the pre-obtained correspondences between each of feed point control state combinations respectively corresponding to each of antenna feed point control manners and a signal strength may include:

detecting a signal strength under different operating scenarios, i.e., under each of feed point control state combinations respectively corresponding to each of antenna feed point control manners, and recording a correspondence between each of the feed point control state combinations respectively corresponding to each of the antenna feed point control manners and the detected signal strength.

Optionally, in the correspondence between each of feed point control state combinations respectively corresponding to each of antenna feed point control manners and the detected signal strength, there is stored at least one of external environment information, geographic location information, resident base station identity, and frequency band standard information of a mobile terminal. With the use of a user, these information related to the received signal strength will be gradually added to a corresponding database of a mobile terminal, thereby providing the user with more abundant information for setting the optimal state of the antenna under different usage scenarios.

A device for controlling an antenna is further provided according to some embodiments of the present application, including: at least two detection devices, at least two pairs of feed points, an antenna controller, and a switch group.

Each of the at least two pairs of feed points includes a signal feed point and a ground feed point and corresponds to at least one detection device. The switch group is configured for connection between each signal feed point and an RF signal, and between each ground feed point and an RF ground.

Each of the detection devices is configured for detecting whether a corresponding antenna radiator is interfered.

The antenna controller is configured for controlling, based on detection by each of the detection devices, each of the at least two pairs of feed points by controlling the switch group to be turned off.

Optionally, the controlling, based on detection by each of the detection devices, each of the at least two pairs of feed points by controlling the switch group to be turned off includes:

turning off a switch for the signal feed point corresponding to a detection device which detects interference, and turning off or on a switch for the ground feed point corresponding to the detection device which detects interference. More specifically, turning off a switch for the signal feed point and a switch for the ground feed point in the switch group corresponding to a detection device which detects interference; or, turning on a switch for the ground feed point in the switch group corresponding to a detection device which detects interference, and turning off a switch for the signal feed point in the switch group corresponding to the detection device which detects interference.

Optionally, the controlling, based on detection by each of the detection devices, each of the at least two pairs of feed points by controlling the switch group to be turned off includes:

for the ground feed point and signal feed point corresponding to a detection device which detects no interference, traversing pre-obtained correspondences between each of feed point control state combinations respectively corresponding to each of antenna feed point control manners and a signal strength, and selecting one of the feed point control state combinations with optimal communication quality for on or off control on the feed points corresponding to the detection device which detects no interference.

Optionally, all detection devices detect interference, and the antenna controller is further configured for:

performing, by using a preset combination control manner, on or off control on each of at least two pairs of feed points respectively corresponding to each of the detection devices which detects interference, for each of at least two pairs of feed points respectively corresponding to each of the detection devices; or controlling the feed points based on a degree of interference, so as to use a less interfered sub-radiation area of the at least two sub-radiation areas of the antenna radiator as a current antenna radiator. For example, a switch for the feed point corresponding to the detection device which detects the most serious interference may be turned off.

A terminal is provided according to some embodiments of the present application, including the antenna according to any of the embodiments described above.

Optionally, the terminal of the present application further includes a processor for detecting a signal strength under different operating scenarios, i.e., under each of feed point control state combinations respectively corresponding to each of antenna feed point control manners, and recording a correspondence between each of the feed point control state combinations respectively corresponding to each of the antenna feed point control manners and the detected signal strength.

Optionally, in the correspondence between each of feed point control state combinations respectively corresponding to each of antenna feed point control manners and the detected signal strength, there is stored at least one of external environment information, geographic location information, resident base station identity, and frequency band standard information of a mobile terminal.

Figure 10:
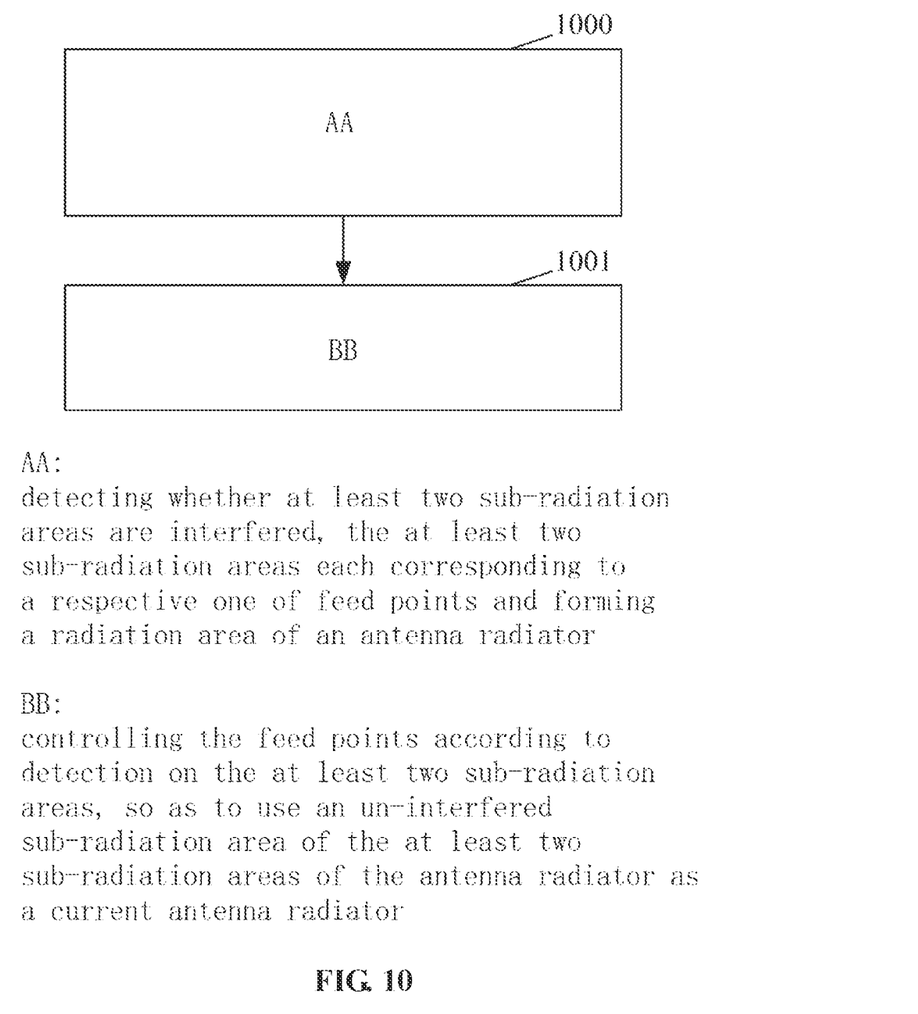
FIG. 10 is a flowchart of a method for implementing control of an antenna according to some embodiments of the present application.

FIG. 10 is a flowchart of a method for implementing control of an antenna according to some embodiments of the present application. As shown in FIG. 10, the method includes the following steps.

At step 1000, detecting whether at least two sub-radiation areas are interfered, the at least two sub-radiation areas each corresponds to a respective one of feed points and forms a radiation area of an antenna radiator.

Optionally, a detection device may be provided on the antenna radiator corresponding to each sub-radiation area to detect whether the sub-radiation area is interfered, the detection device may be any device that can detect whether the antenna radiator is interfered, for example, a sensor that detects whether a corresponding sub-radiation is interfered.

Optionally, according to some embodiments of the present application, the sensor may include, but is not limited to, an inductive sensor, a capacitive sensor, and the like.

Optionally, the detecting whether at least two sub-radiation areas are interfered includes:

detecting a dielectric state of each of the at least two sub-radiation areas; if it is detected that there is a change in the dielectric state of a sub-radiation area, for example, a dielectric state value detected is higher than a preset detection threshold, it is considered that the sub-radiation area of the antenna radiator is interfered, i.e., close to or in contact with a medium, and the interference state value may be represented by a number "1"; if the dielectric state value detected by the sensor is not higher than the preset detection threshold, it is considered that the sub-radiation area of the antenna radiator is not interfered, i.e., not close to or in contact with a medium, and the interference state value may be represented by a number "0".

In addition, when the detected dielectric state value is higher than the preset detection threshold, the greater the difference between the detected dielectric state value and the preset detection threshold, the more serious the interference is.

At step 1001, controlling the feed points based on detection on the at least two sub-radiation areas, so as to use an un-interfered sub-radiation area of the at least two sub-radiation areas of the antenna radiator as a current antenna radiator.

Optionally, step 1001 specifically includes:

obtaining a combination of interference state values for each of the at least two sub-radiation areas based on detection on each of the at least two sub-radiation areas, and controlling the feed points in an antenna feed point control manner corresponding to the combination of interference state values for each of the at least two sub-radiation areas, so as to use an un-interfered sub-radiation area of the at least two sub-radiation areas as a current antenna radiator.

Optionally, the feed points include a signal feed point and a ground feed point. A switch group is configured for connection between the signal feed point and an RF signal, and between the ground feed point and an RF ground.

Optionally, the controlling the feed points in an antenna feed point control manner corresponding to the combination of interference state values for each of the at least two sub-radiation areas, so as to use an un-interfered sub-radiation area of the at least two sub-radiation areas as a current antenna radiator includes:

turning off a switch for the signal feed point corresponding to a detection device which detects interference, and turning off or on a switch for the ground feed point corresponding to the detection device which detects interference. That is, turning off a switch for the ground feed point and a switch for the signal feed point corresponding to an interfered sub-radiation area of the at least two sub-radiations; or turning on the switch for the ground feed point corresponding to the interfered sub-radiation area of the at least two sub-radiations, and turning off the switch for the signal feed point corresponding to the interfered sub-radiation area of the at least two sub-radiations.

Optionally, the controlling the feed points in an antenna feed point control manner corresponding to the combination of interference state values for each of the at least two sub-radiation areas, so as to use an un-interfered sub-radiation area of the at least two sub-radiation areas as a current antenna radiator includes:

for the ground feed point and signal feed point corresponding to the un-interfered sub-radiation area of the at least two sub-radiations, traversing pre-obtained correspondences between each of feed point control state combinations respectively corresponding to each of antenna feed point control manners and a signal strength, and selecting one of the feed point control state combinations with optimal communication quality for on or off control on the feed points corresponding to the un-interfered sub-radiation area of the at least two sub-radiations.

Optionally, if the detection devices on the antenna radiator respectively corresponding to each of the sub-radiation areas detect that all corresponding sub-radiation areas are interfered, then the method further includes:

performing, by using a preset combination control manner, on or off control on the feed points respectively corresponding to each of the at least two sub-radiation areas that is interfered, for the feed points of all of the at least two sub-radiation areas; or controlling the feed points based on a degree of interference, so as to use a less interfered sub-radiation area of the at least two sub-radiation areas of the antenna radiator as a current antenna radiator. For example, a switch for the feed point corresponding to the most seriously interfered sub-radiation area may be turned off.

The method of implementing control of an antenna of the present application further includes: storing current control information on the feed points respectively corresponding to each of the at least two sub-radiation areas, and sharing the current control information to a cloud through a network.

Optionally, according to some embodiments of the present application, the method further includes, before step 1001: pre-obtaining a correspondence between each of feed point control state combinations corresponding to each of antenna feed point control manner and a signal strength, specifically including:

detecting a signal strength under different operating scenarios, i.e., under each of feed point control state combinations respectively corresponding to each of antenna feed point control manners, and recording a correspondence between each of the feed point control state combinations respectively corresponding to each of the antenna feed point control manners and the detected signal strength.

Optionally, in the correspondence between each of feed point control state combinations respectively corresponding to each of antenna feed point control manners and the detected signal strength, there is stored at least one of external environment information, geographic location information, resident base station identity, and frequency band standard information of a mobile terminal. With use of a user, the information related to the received signal strength will be gradually added to a corresponding database of a mobile terminal, thereby providing the user with more abundant information for setting the optimal state of the antenna under different usage scenarios.

By using the method for controlling an antenna according to some embodiments of the present application, in which the same antenna is divided equivalently so as to control feed points of a sub-radiation area for using or abandoning thereof, in order to abandon an interfered sub-radiation area of the antenna radiator instead of directly abandoning the interfered antenna, it is possible to achieve control on whether to use an area divided from the antenna or not, which ensures the antenna performance and the communication quality, and the present application is not limited to scenarios with at least two antennas.

According to some embodiments of the present application, a computer-readable storage medium storing computer-executable instructions which are configured for performing the method for implementing control of an antenna according to any one of the embodiments described above, is further provided.

According to some embodiments of the present application, a device for implementing control of an antenna is further provided, including a processor, a memory storing computer programs executable by the processor for: detecting whether at least two sub-radiation areas are interfered, the at least two sub-radiation areas each corresponding to a respective one of feed points and forming a radiation area of an antenna radiator; controlling the feed points based on detection on the at least two sub-radiation areas, so as to use an un-interfered sub-radiation area of the at least two sub-radiation areas of the antenna radiator as a current antenna radiator.

The following describes, by way of example, the method for implementing control of an antenna of the present application.

Assuming that an end user is talking by holding a mobile phone with his/her right hand, and as shown in FIG. 5, the antenna radiator of the mobile phone is provided with sensors each corresponding to a respective one of three pre-divided sub-radiation areas. In this embodiment, it is detected by one of the sensors that Sub-radiation area 3 is touched by the hand of the end user, as shown in Table 1, it is determined to be state II, and the corresponding antenna feed point control manner is: using feed points corresponding to Sub-radiation area 1 and Sub-radiation area 2 instead of the feed points corresponding to Sub-radiation area 3.

Optionally, in order to achieve the corresponding antenna feed point control manner, as shown in FIG. 9, first, switches on paths to the ground and signal feed points of Sub-radiation area 3, i.e., switch K6 and switch K3, are turned off. For the switches for the ground and signal feed points corresponding to Sub-radiation area 1 and Sub-radiation area 2, traversing pre-stored correspondences between each of feed point control state combinations respectively corresponding to each of antenna feed point control manners and a signal strength, and selecting one of the feed point control state combinations with optimal communication quality for control on the feed points corresponding to the used sub-radiation areas, i.e., for on or off control on the relevant feed points based on the selected feed point control state combinations. Optionally, current control information on the feed points respectively corresponding to each of the at least two sub-radiation areas may be stored.

In this embodiment, assuming that 0 represents a switch is turned off, and 1 represents a switch is turned on. In this embodiment, a loop antenna is taken as an example, and is preset as follows: at least one switch for the signal feed point and at least one switch for the ground feed point are turned on, then the feed point control states for Sub-radiation area 1 and Sub-radiation area 2 are shown in Table 2:

TABLE 2

| Signal feed point for Sub-radiation area 1 | Signal feed point for Sub-radiation area 2 | Ground feed point for Sub-radiation area 1 | Ground feed point for Sub-radiation area 2 | Feed point control state |
|---|---|---|---|---|
| 0 | 0 | 0 | 0 | Nonexistence |
| 0 | 0 | 0 | 1 | Nonexistence |
| 0 | 0 | 1 | 0 | Nonexistence |
| 0 | 0 | 1 | 1 | Nonexistence |
| 0 | 1 | 0 | 0 | Nonexistence |
| 0 | 1 | 0 | 1 | a |
| 0 | 1 | 1 | 0 | b |
| 0 | 1 | 1 | 1 | c |
| 1 | 0 | 0 | 0 | Nonexistence |
| 1 | 0 | 0 | 1 | d |
| 1 | 0 | 1 | 0 | e |
| 1 | 0 | 1 | 1 | f |
| 1 | 1 | 0 | 0 | Nonexistence |
| 1 | 1 | 0 | 1 | g |
| 1 | 1 | 1 | 0 | h |
| 1 | 1 | 1 | 1 | i |

In this embodiment, assuming that the signal quality corresponding to the feed point control state d is optimal, then based on the method for implementing control of an antenna provided by the present application, a feed point control manner for a sub-radiation area with the best communication quality, which corresponds to that an end user is calling by holding a mobile phone with his/her right hand, is obtained.

Optionally, in this embodiment, the actual operation of the terminal in a complex environment may further includes: marking an area on the antenna radiator that is detected to be touched by the end user's hand.

In this embodiment, based on the correspondence between the combination of interference state values of each of the sub-radiation areas and the antenna feed point control manner shown in Table 1, Sub-radiation area 3 which is touched by the end user' hand is marked as 001, which corresponds to state II. Based on the correspondence between each of feed point control state combinations corresponding to each of antenna feed point control manner and a signal strength, obtaining feed point control state combinations for ground and signal feed points corresponding to Sub-radiation areas 1 and 2 in state d with optimal communication quality, and switching via the switch group to enable the antenna with optimal performance, which equivalently cuts out Sub-radiation area 3, thereby improving the user's communication experience.

The above description is only preferred embodiments of the present disclosure, and is not intended to limit the scope of the disclosure. Any modifications, equivalent substitutions and improvements made within the concept and principle of the present disclosure shall fall within the scope of the present disclosure.

The invention claimed is:

1. An antenna, comprising:
    an antenna radiator, which has a radiation area comprising at least two sub-radiation areas each corresponding to a respective one of feed points;
    detection devices, each of which corresponds to a respective sub-radiation area of the at least two sub-radiation areas and is configured for detecting whether the respective sub-radiation area is interfered; and
    an antenna controller, which is configured for controlling the feed points based on detection on the at least two sub-radiation areas, so as to use an un-interfered sub-radiation area of the at least two sub-radiation areas of the antenna radiator as a current antenna radiator.

2. The antenna of claim 1, wherein the antenna controller is further configured for storing current control information on the feed points respectively corresponding to each of the at least two sub-radiation areas, and sharing the current control information to a cloud through a network.

3. The antenna of claim 1, wherein, in response to the detection devices detecting that all of the at least two sub-radiation areas are interfered, the antenna controller is further configured for:
    performing, by using a preset combination control manner, on or off control on the feed points respectively corresponding to each of the at least two sub-radiation areas that is interfered, for the feed points of all of the at least two sub-radiation areas; or
    controlling the feed points based on a degree of interference, so as to use a less interfered sub-radiation area of the at least two sub-radiation areas of the antenna radiator as a current antenna radiator.

4. The antenna of claim 1, wherein the antenna controller is further configured for:
    obtaining a combination of interference state values for each of the at least two sub-radiation areas based on detection on each of the at least two sub-radiation areas, and
    controlling the feed points in an antenna feed point control manner corresponding to the combination of interference state values for each of the at least two sub-radiation areas, so as to use an un-interfered sub-radiation area of the at least two sub-radiation areas of the antenna radiator as a current antenna radiator.

5. The antenna of claim 4, wherein the feed points comprises a signal feed point and a ground feed point; and a switch group is configured for connection between the signal feed point corresponding to each of the at least two sub-radiation areas and an RF signal, and between the ground feed point corresponding to each of the at least two sub-radiation areas and an RF ground.

6. The antenna of claim 5, wherein the controlling the feed points based on detection on the at least two sub-radiation areas, so as to use an un-interfered sub-radiation area of the at least two sub-radiation areas of the antenna radiator as a current antenna radiator comprises:

turning off a switch for the ground feed point and a switch for the signal feed point corresponding to an interfered sub-radiation area of the at least two sub-radiation areas; or turning on the switch for the ground feed point corresponding to the interfered sub-radiation area of the at least two sub-radiation areas, and turning off the switch for the signal feed point corresponding to the interfered sub-radiation area of the at least two sub-radiation areas;

for the ground feed point and signal feed point corresponding to the un-interfered sub-radiation area of the at least two sub-radiation areas, traversing pre-obtained correspondences between each of feed point control state combinations respectively corresponding to each of antenna feed point control manners and a signal strength, and selecting one of the feed point control state combinations with optimal communication quality for on or off control on the feed points corresponding to the un-interfered sub-radiation area of the at least two sub-radiation areas.

7. A terminal, comprising the antenna of claim 1.

8. The terminal of claim 7, further comprising a processor configured for:

detecting a signal strength under each of feed point control state combinations respectively corresponding to each of antenna feed point control manners, and recording a correspondence between each of the feed point control state combinations respectively corresponding to each of the antenna feed point control manners and the detected signal strength.

9. The terminal of claim 8, wherein the correspondence further stores at least one of: external environment information, geographic location information, resident base station identity, and frequency band standard information of a mobile terminal to which the antenna belongs.

10. A method for implementing control of an antenna, comprising:

detecting whether at least two sub-radiation areas are interfered, the at least two sub-radiation areas each corresponding to a respective one of feed points and forming a radiation area of an antenna radiator;

controlling the feed points based on detection on the at least two sub-radiation areas, so as to use an un-interfered sub-radiation area of the at least two sub-radiation areas of the antenna radiator as a current antenna radiator.

11. The method of claim 10, wherein the detecting whether at least two sub-radiation areas are interfered comprises:

detecting a dielectric state of each of the at least two sub-radiation areas, and determining that a sub-radiation area of the at least two sub-radiation areas of the antenna radiator is interfered in response to detecting a change in the dielectric state of the sub-radiation area or not interfered in response to detecting no change in the dielectric state of the sub-radiation area.

12. The method of claim 11, wherein the determining that a sub-radiation area of the at least two sub-radiation areas of the antenna radiator is interfered comprises:

determining that the sub-radiation area is close to or in contact with a medium.

13. The method of claim 10, wherein the controlling the feed points based on detection on the at least two sub-radiation area of the at least two sub-radiation areas of the antenna radiator as a current antenna radiator comprises:

obtaining a combination of interference state values for each of the at least two sub-radiation areas based on detection on each of the at least two sub-radiation areas, and controlling the feed points in an antenna feed point control manner corresponding to the combination of interference state values for each of the at least two sub-radiation areas, so as to use an un-interfered sub-radiation area of the at least two sub-radiation areas as a current antenna radiator.

14. The method of claim 13, further comprising, before the controlling the feed points in an antenna feed point control manner corresponding to the combination of interference state values for each of the at least two sub-radiation areas, so as to use an un-interfered sub-radiation area of the at least two sub-radiation areas as a current antenna radiator:

pre-obtaining a correspondence between each of feed point control state combinations respectively corresponding to each of antenna feed point control manners and a signal strength, comprising:

detecting a signal strength under each of feed point control state combinations respectively corresponding to each of antenna feed point control manners, and recording a correspondence between each of the feed point control state combinations respectively corresponding to each of the antenna feed point control manners and the detected signal strength.

15. The method of claim 14, wherein the correspondence further stores at least one of: external environment information, geographic location information, resident base station identity, and frequency band standard information of a mobile terminal to which the antenna belongs.

16. The method of claim 13, wherein the feed points comprise a signal feed point and a ground feed point, the controlling the feed points in an antenna feed point control manner corresponding to the combination of interference state values for each of the at least two sub-radiation areas, so as to use an un-interfered sub-radiation area of the at least two sub-radiation areas as a current antenna radiator comprises:

turning off a switch for the signal feed point corresponding to a detection device which detects interference, and turning off or on a switch for the ground feed point corresponding to the detection device which detects interference.

17. The method of claim 13, wherein the feed points comprise a signal feed point and a ground feed point, the controlling the feed points in an antenna feed point control manner corresponding to the combination of interference state values for each of the at least two sub-radiation areas, so as to use an un-interfered sub-radiation area of the at least two sub-radiation areas as a current antenna radiator comprises:

for the ground feed point and signal feed point corresponding to the un-interfered sub-radiation area of the at least two sub-radiation areas, traversing pre-obtained correspondences between each of feed point control state combinations respectively corresponding to each of antenna feed point control manners and a signal strength, and selecting one of the feed point control state combinations with optimal communication quality for on or off control on the feed points corresponding to the un-interfered sub-radiation area of the at least two sub-radiation areas.

18. The method of claim 10, wherein, in response to all of the at least two sub-radiation areas being detected to be interfered, the method further comprises:

performing, by using a preset combination control manner, on or off control on the feed points respectively corresponding to each of the at least two sub-radiation areas that is interfered, for the feed points of all of the at least two sub-radiation areas; or controlling the feed points based on a degree of interference, so as to use a less interfered sub-radiation area of the antenna radiator as a current antenna radiator.

19. The method of claim 10, further comprising: storing current control information on the feed points respectively corresponding to each of the at least two sub-radiation areas, and sharing the current control information to a cloud through a network.

20. A device for implementing control of an antenna, comprising:

a processor; and a memory storing computer programs executable by the processor for:

detecting whether at least two sub-radiation areas are interfered, the at least two sub-radiation areas each corresponding to a respective one of feed points and forming a radiation area of an antenna radiator;

controlling the feed points based on detection on the at least two sub-radiation areas, so as to use an un-interfered sub-radiation area of the at least two sub-radiation areas of the antenna radiator as a current antenna radiator.

\* \* \* \* \*